(12) United States Patent
Tietze

(10) Patent No.: US 6,382,663 B1
(45) Date of Patent: May 7, 2002

(54) HOUSING FOR A GAS BAG RESTRAINT SYSTEM FOR THE PROTECTION OF A VEHICLE OCCUPANT IN THE EVENT OF A SIDE IMPACT

(75) Inventor: Hans-Joachim Tietze, Heubach (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/336,041

(22) Filed: Jun. 18, 1999

(30) Foreign Application Priority Data

Jun. 19, 1998 (DE) ..................... 298 11 038 U

(51) Int. Cl.⁷ ................. B60R 21/16; B60R 21/20; B60R 21/22
(52) U.S. Cl. ................. 280/730.2; 280/728.2; 280/743.2
(58) Field of Search ........... 280/728.1, 728.2, 280/728.3, 730.2, 743.2

(56) References Cited

U.S. PATENT DOCUMENTS

| | | | | |
|---|---|---|---|---|
| 5,310,213 A | * | 5/1994 | Mori ..................... | 280/728.2 |
| 5,577,764 A | * | 11/1996 | Webber et al. ........... | 280/728.2 |
| 5,588,667 A | * | 12/1996 | Emambakhsh et al. .. | 280/728.2 |
| 5,645,295 A | * | 7/1997 | White, Jr. et al. ....... | 280/730.2 |
| 5,690,354 A | * | 11/1997 | Logan et al. ............ | 280/728.2 |
| 5,810,390 A | * | 9/1998 | Enders et al. ............ | 280/730.2 |
| 5,890,733 A | * | 4/1999 | Dillon ..................... | 280/730.2 |
| 5,971,427 A | * | 10/1999 | Whited et al. ........... | 280/730.2 |
| 6,073,961 A | * | 6/2000 | Bailey et al. ............ | 280/730.2 |

FOREIGN PATENT DOCUMENTS

| | | |
|---|---|---|
| DE | 4238427 | 5/1993 |
| DE | 19726782 | 1/1998 |
| GB | 2293355 | 3/1996 |

* cited by examiner

Primary Examiner—Peter C. English
Assistant Examiner—Ruth Ilan
(74) Attorney, Agent, or Firm—Tarolli, Sundheim, Covell Tummino & Szabo L.L.P.

(57) ABSTRACT

A housing for a gas bag restraint system for the protection of a vehicle occupant in the event of a side impact has at least one end face for the emergence of components of the restraint system from the housing. The end face has at least one flap. This flap serves for fixing the components emerging from the housing.

5 Claims, 2 Drawing Sheets

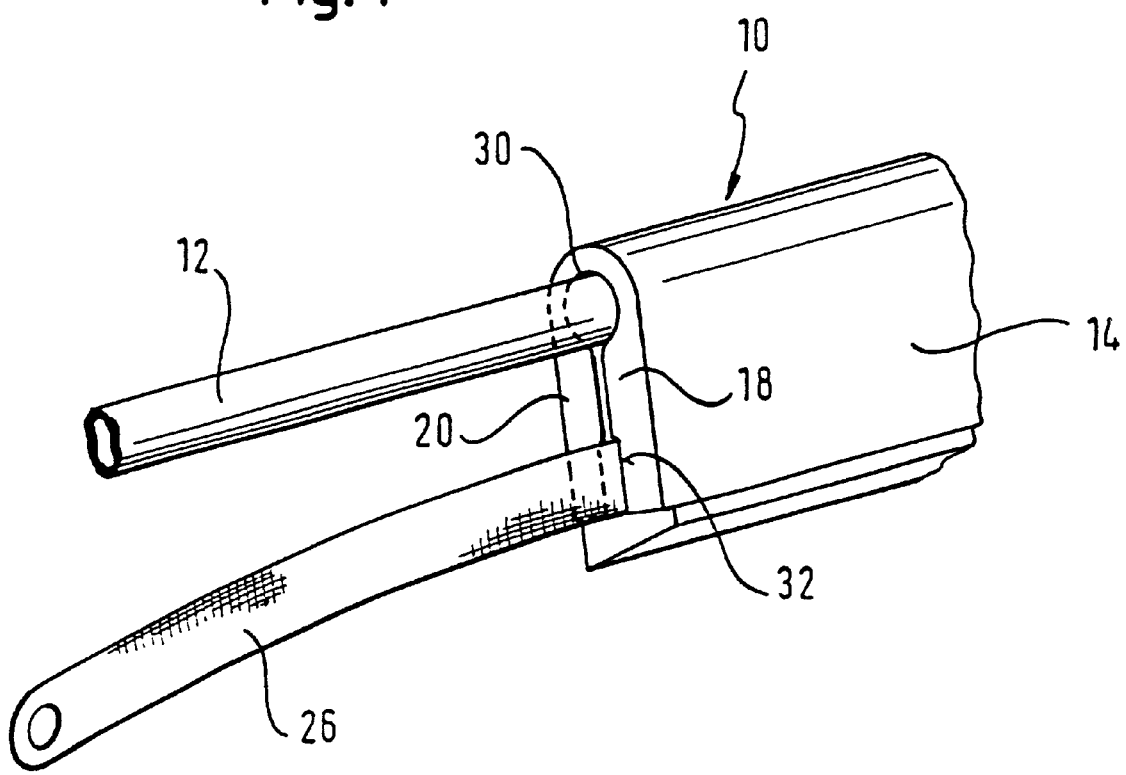
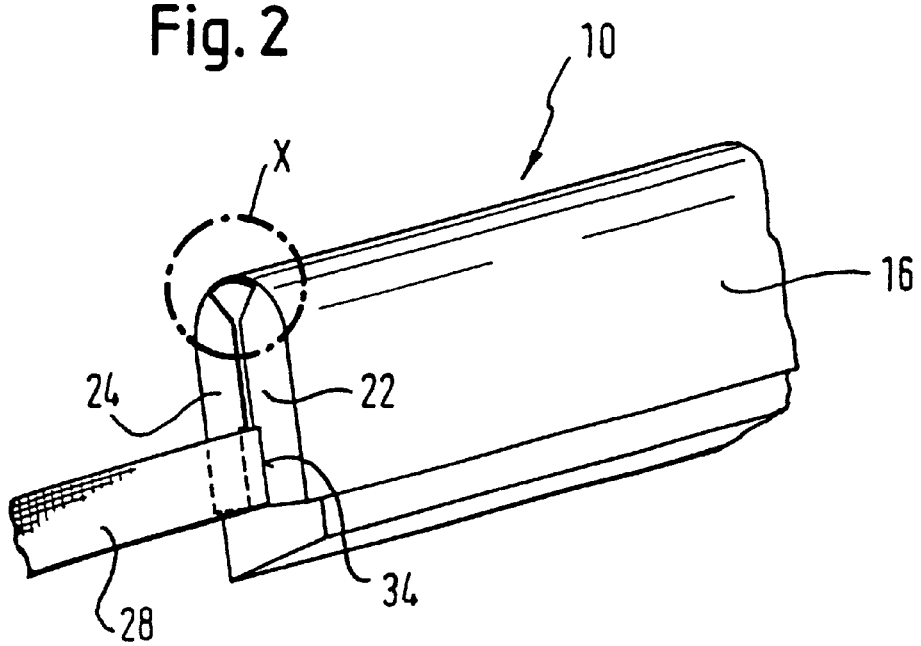

HOUSING FOR A GAS BAG RESTRAINT SYSTEM FOR THE PROTECTION OF A VEHICLE OCCUPANT IN THE EVENT OF A SIDE IMPACT

The invention relates to a housing for a gas bag restraint system for the protection of a vehicle occupant in the event of a side impact.

BACKGROUND OF THE INVENTION

A housing for such gas bag restraint system has end faces through which components of the restraint system emerge from the housing. The components to emerge from the end faces of the housing are in particular a gas lance, by means of which a gas bag arranged inside the housing can be provided with gas, as well as tensioning straps by means of which the gas bag in the inflated state is positioned and held in place along a part of the side structure of a vehicle. Conventionally, the end faces are designed to be open and the gas bag contained within the housing is surrounded by a foil by means of which it is held in position.

BRIEF DESCRIPTION OF THE INVENTION

In contrast to this approach, the invention provides a housing for a gas bag restraint system for the protection of a vehicle occupant in the event of a side impact, which has at least one end face for the emergence of components of the restraint system from the housing. The end face has at least one flap. This flap serves for fixing the components emerging from the housing. This design ensures on the one hand that the end faces of the housing are closed, which protects the inside of the housing from contamination by dirt, and, on the other, that the ejection channel formed by the housing is stabilized, because the provision of the flaps prevents the ejection channel from collapsing before the housing is installed in the vehicle. In addition, there is the advantage provided by the design that the components emerging from the housing are fixed, which proves advantageous during the process of installation of the housing.

Advantageous embodiments of the invention can be seen from the sub-claims.

BRIEF DESCRIPTION OF THE DRAWINGS

In the following, the invention is described with reference to a preferred embodiment illustrated in the attached drawings, wherein:

FIG. 1 shows a perspective view of an end of a housing according to the invention which is arranged at the rear of a restraint system installed in the vehicle;

FIG. 2 shows a perspective view of an end of a housing according to the invention which is arranged at the front of a restraint system installed in the vehicle;

DETAILED DESCRIPTION OF THE INVENTION

Figure 3:
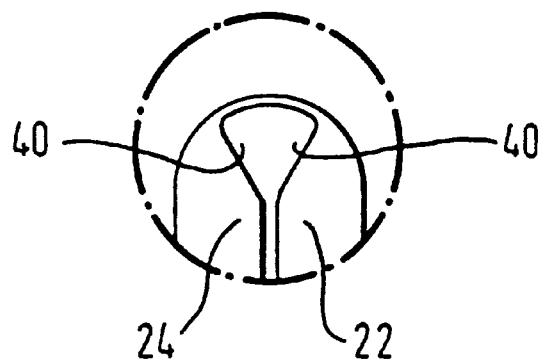
FIG. 3 shows an enlarged view of detail X of FIG. 2.

FIGS. 1 to 4 illustrate a housing according to the invention which forms part of a gas bag restraint system for the protection of a vehicle occupant in the event of a side impact. The housing, generally identified by the reference number 10, is normally arranged along the roof structure of a vehicle so that a gas bag, arranged inside the housing and not shown in the illustrations, is able to unfold along part of the side structure of the vehicle. To this purpose, pressurized gas can be introduced into the gas bag by means of a gas lance 12 which extends into the housing and into the gas bag received therein.

The housing 10 has a generally U-shaped cross-section with two side walls 14, 16.

Two flaps are arranged at each of the end faces of the U-shaped housing, that is the flaps 18, 20 at the end of the housing which points to the rear when installed, as well as the flaps 22, 24 at the opposite end. The flaps are fashioned in such a way that one of their individual length sides is connected to one of the side walls 14, 16 of the housing, respectively, and that their opposite sides adjoin each other. This ensures that the housing 10 is closed at its end faces.

To allow the passage of the gas lance 12, as well as of the tensioning straps 26, 28, which are used to position and secure the gas bag inside the vehicle, the flaps 18, 20, 22, 24 are provided with cutouts which in total form a passage opening 30 for the gas lance 12, a passage opening 32 for the tensioning strap 26 and a passage opening 34 for the tensioning strap 28. The passage openings formed by the cutouts are so dimensioned that the gas lance 12, as well as the tensioning straps 26, 28 are held in these openings.

As can be seen in FIGS. 2 and 3, a triangular cutout 40 is provided in each flap in the area of the joining section of the housing between the side walls 14, 16. These cutouts ensure that the flaps can be more easily opened, for example to allow the emergence of the tensioning straps from the corresponding openings.

The housing is preferably made of injection molded plastic, the flaps being able to be produced as an integral part of the housing by using a suitably shaped injection molding tool.

Figure 4:
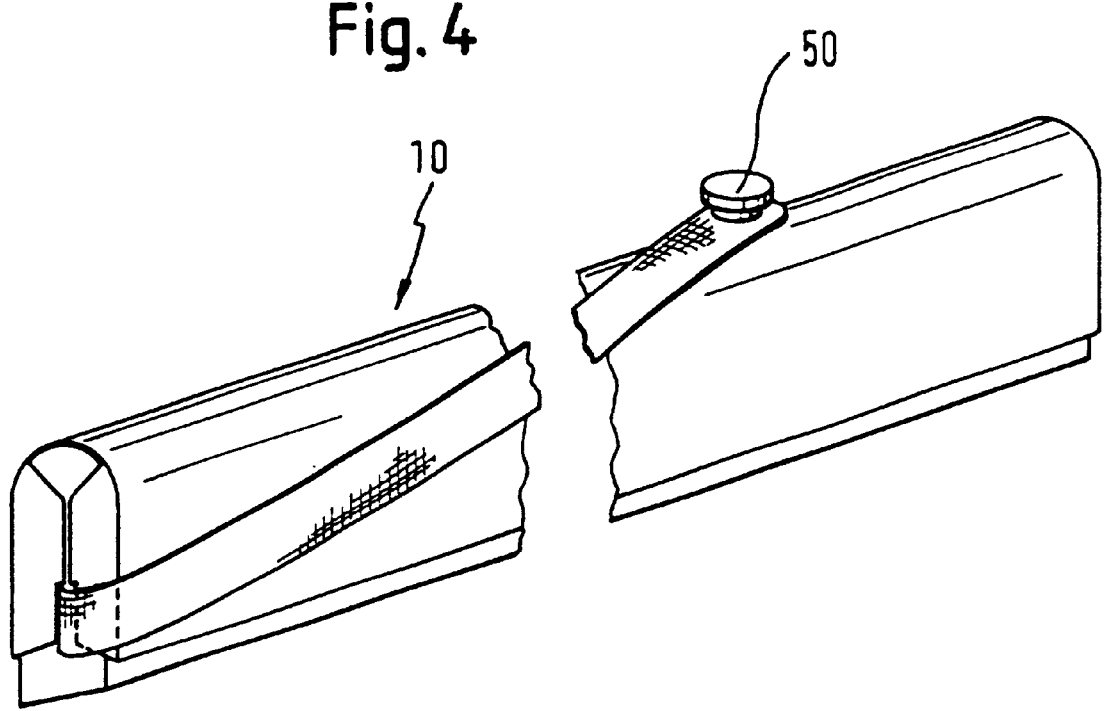
FIG. 4 shows a perspective, broken view of a housing according to the invention.

As can be seen in FIG. 4, a fixing protrusion 50 can be provided on the outside of the housing 10, to which the end of the corresponding tensioning strap used to secure the unit to the vehicle, may be temporarily secured during transportation of the housing together with the components contained therein, to ensure that it does not get in the way and that it cannot get entangled.

What is claimed is:

1. A gas bag restraint system for the protection of a vehicle occupant in the event of a side impact including a housing having at least one end face for the emergence of components of said restraint system from said housing, said end face having at least one flap, said flap serving to fix said components emerging from said housing, said housing having two side walls lying opposite each other, said end face being provided with two of said flaps, each of said flaps having two sides and being fitted to one of said side walls with a first of said sides, a second of said sides of said flaps adjoining each other, said flaps at the adjoining of said sides including a plurality of cutouts, each of said cut outs providing a passage opening for a respective component, and a tensioning strap of said gas bag being arranged within said cutouts.

2. The gas bag restraint system of claim 1 wherein a securing protrusion is provided on the outside of said housing for attaching an end of said tensioning strap which has emerged from said housing.

3. The gas bag restraint system of claim 1 wherein a gas lance is arranged within said cutouts.

4. The gas bag restraint system of claim 1 wherein said housing is manufactured from plastic, said at least one flap being formed as an integral part of said housing.

5. A gas bag restraint system for the protection of a vehicle occupant in the event of a side impact including a housing having at least one end face for the emergence of components of said restraint system from said housing, said end face having at least one flap, said flap serving to fix said components emerging from said housing, said housing having two side walls lying opposite each other, said end face being provided with two of said flaps, each of said flaps having two sides and being fitted to one of said side walls with a first of said sides, a second of said sides of said flaps adjoining each other, said flaps at the adjoining of said sides including a plurality of cutouts, each of said cut outs providing a passage opening for a respective component, said housing being manufactured from plastic, said at least one flap being formed as an integral part of said housing, said at least one of said flaps having a triangular cutout in the area of a section joining said housing between said side walls.

* * * * *